Aug. 10, 1965  E. B. SULLIVAN ETAL  3,199,318
CLEANING MACHINE AND SEAL MEANS THEREFOR
Filed Feb. 20, 1963
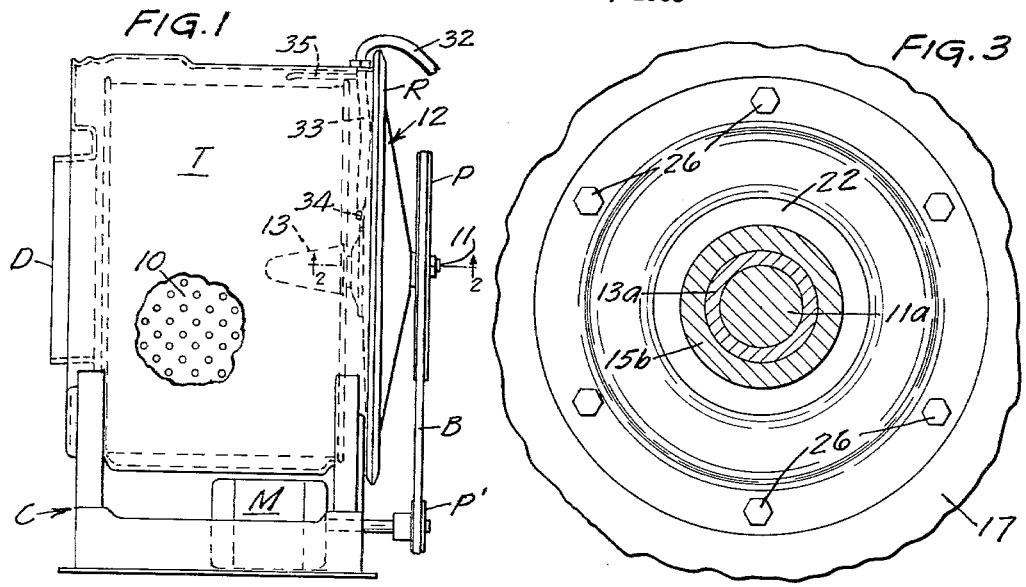
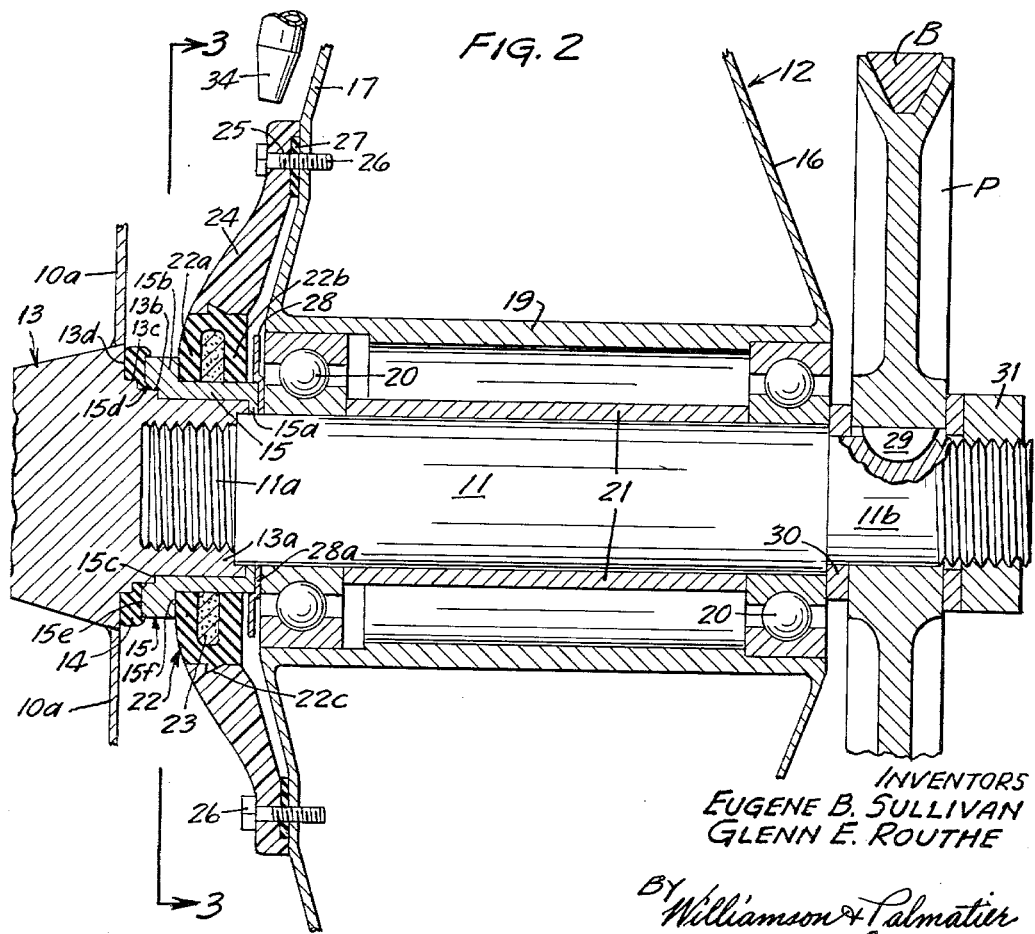
INVENTORS
EUGENE B. SULLIVAN
GLENN E. ROUTHE
BY Williamson & Palmatier
ATTORNEYS

United States Patent Office 3,199,318
Patented Aug. 10, 1965

3,199,318
CLEANING MACHINE AND SEAL
MEANS THEREFOR
Eugene B. Sullivan, Minneapolis, and Glenn E. Routhe, West St. Paul, Minn., assignors to Eugene B. Sullivan, Minneapolis, Minn.
Filed Feb. 20, 1963, Ser. No. 259,873
16 Claims. (Cl. 68—140)

This invention relates generally to seals, especially those between coacting stationary and movable parts and in particular to a new and improved bearing seal for use on automatic washing and dry cleaning machines, although the scope of the invention is not necessarily limited thereto.

The invention finds particular applicability to and use in front loading type washers and dry cleaners, in which the clothes carrying cylinder or basket rotates about a horizontal axis. In most washers and dry cleaners of this type, such as those put out by Philco-Bendix, the clothes carrying cylinder is mounted for rotation within a tub enclosing same. The cylinder is mounted on and rotated by a driven cylinder shaft, which shaft is supported by a tub back assembly which is removably secured to and encloses the back of the tub. The back assembly houses the cylinder shaft support bearings and the cylinder shaft seal. The bearings are pressed in a steel hub and are of the sealed ball bearing type. The cylinder shaft seal is a spring loaded carbon nosed seal and rides on a bronze sealing face affixed to the cylinder shaft hub, which hub constitutes an integral part of the cylinder. The inside of the tub back assembly including the aforementioned cylinder shaft seal is exposed to the liquid within the machine and to the dirt, lint, etc., which is developed therein during the washing or cleaning operation. The aforementioned conventional sealing means in these machines is intended to prevent the liquid in the machine from reaching the interior of the tub back assembly and the bearings and other working parts enclosed therewithin. However, these sealing means have not proved as effective as desired during use. Experience has shown that after these machines have been in operation for a relatively short time, the liquid escapes past the conventional sealing means into the interior of the tub back assembly, causing rusting, freezing and mal-functioning of the parts enclosed therein and necessitating frequent servicing and replacement of various parts, particularly the bearings. The leaking of liquid into the interior of the tub back assembly frequently goes unnoticed, and the machine is permitted to operate for long periods of time in such a condition. Where this occurs, the damage to the machine is rather extensive and expensive to repair.

One of the major reasons for the leaking of the liquid past the seal is the fact that lint, dirt, fibers, etc., collect on the cylinder shaft seal and quickly builds up thereon to a point where the spring mechanism thereof is rendered ineffective and the sealing surfaces are separated, thereby permitting the liquid to enter the tub assembly and gain access to the working parts therein.

An object of this invention is to provide new and improved sealing means which overcome the aforementioned problems and provide a more effective seal than has heretofore been attainable.

Another object is to provide new and improved sealing means which are simpler in design and less expensive in construction than heretofore and are more effective for the purpose intended.

Still another object is to provide new and improved sealing means of the type hereinbefore described which can be interchangeably used as original or replacement parts on conventional washing and cleaning machines of the type hereinbefore described.

These and other objects and advantages of this invention will more fully appear from the following description made in connection with the accompanying drawings wherein like reference characters refer to the same or similar parts throughout the several views, and in which:

FIG. 1 is a somewhat schematic side elevational assembly view (with portions broken away) of a typical washing or cleaning machine embodying this invention;

FIG. 2 is a sectional view on an enlarged scale taken approximately along the line 2—2 of FIG. 1; and FIG. 3 is a sectional view taken on the line 3—3 of FIG. 2.

Reference is now made to the accompanying drawings for a more detailed description of the invention.

FIG. 1 somewhat schematically illustrates an assembled machine which may be used as a conventional washing machine using water and any suitable detergent, or which may be used for dry cleaning purposes utilizing any suitable dry cleaning solvent or liquid. The assembly illustrated in FIG. 1 includes a tub T mounted on a suitable cradle and channel assembly C. A cylinder or basket 10 for receiving and carrying clothes or other soft goods to be cleaned having the usual perforated or foraminous wall structure is mounted for rotation within the tub T about a horizontal axis, the good to be cleaned being inserted into the basket through the opening or clothes door D. The cylinder is mounted on a cylinder shaft 11 and is rotatably driven thereby, the cylinder shaft in turn being supported by a conically shaped tub back assembly indicated in its entirety by 12, the tub back assembly being mounted on the back of the tub to enclose same by any conventional means such as a gasket and a large V clamp ring R. A driven pulley P is mounted on and keyed to the outer end of the cylinder shaft for turning same, said pulley P being driven by a drive pulley P' through the medium of an endless drive belt B trained about said pulleys, said pulley P' in turn being driven by a motor M.

Attention is now directed to FIGS. 2 and 3 inclusive for a more detailed description and better understanding of the invention. The back wall 10a of the cylinder is provided with a central hub portion 13 having an internally threaded bore for receiving and threadedly engaging the externally threaded reduced inner end portion 11a of the cylinder shaft. Externally, the hub comprises a reduced cylindrical outer end portion 13a, and a series of inwardly disposed juxaposed outwardly facing cylindrical annular shoulders 13b, 13c and 13d of successively larger diameter, in that order, the back wall 10a of the clothes basket being welded or otherwise suitably secured to the outer periphery of 13d.

An annular cylindrically bored resilient, spongy, compressible and deformable gasket or seal 14 of any suitable material such as neoprene capable of effecting a fluid tight seal with the hub is fitted over the hub so that the inner wall of the seal encloses and sealingly engages the peripheral wall of the shoulder 13b about the entire circumference thereof.

A cylindrical collar 15 is provided which is capable of being slid unto the outer end portion 13a of the hub in close fitting relationship therewith. The collar may be press fitted unto the hub or in free sliding relationship therewith, the latter normally being preferred for ease in mounting and dismounting same. In any event, the collar is maintained in position by the tub back assembly. The outer end of the collar is provided with an annular radially inwardly extending flange 15a which overlaps the outer end of the hub portion 13a. The inner end of the collar has an enlarged annular radially outwardly extending flange portion 15b which preferably has an outer diameter smaller than that of the seal 14. The inner end of the collar is countersunk to provide a shoulder 15c which abuts with the shoulder 13b of the hub and which enables a portion of the flange 15b to overlap and overlie the hub shoulder 13b. The overlapping portion of the flange is annularly chamfered or beveled as at 15d, which annular beveled portion 15d lies opposed to the shoulder 13c of the hub. When the seal 14 and collar 15 are properly mounted on the hub in the manner shown, the inner face 15e of the collar presses against the seal, deforms it and forces it into sealing engagement with the radial face of the hub shoulder 13d and into overlapping sealing engagement with the hub shoulder 13c, the chamfered surface 15d assisting in and contributing to the formation of the seal 14 about the shoulder 13c and materially assisting in maintaining the gasket in sealing relationship with this shoulder portion. When so mounted, the flange of the collar presses into and becomes embedded in the seal 14 so that the outer marginal edge of the face 15e is overlapped, enclosed and surrounded by the seal in sealing relationship therewith. Thus, the seal 14 and collar 15 cooperate to provide a fluid tight seal with the hub and prevent liquid gaining access to any of the exterior surfaces of the hub portion which are engaged and enlcosed by the seal and collar.

After the cylinder shaft hub, cylinder shaft, seal 14 and collar 15 have been assembled in the manner shown, the tub back assembly 12 is then mounted on the shaft 11 in the manner illustrated. The tub back assembly is concially shaped and includes an outer wall 16 and an inner wall 17, the outer edges of said walls being joined together whereby the entire tub back assembly can be removably mounted on the back of the tub in sealed relationship therewith by means of a gasket (not shown) and a V clamp ring R. The inner wall 17 is exposed to water or other liquid in the machine and is preferably covered with porcelain enamel to eliminate any danger of rust formation. The tub back assembly also includes a steel hub 19 to which the walls 16 and 17 are secured and into which a pair of shaft supporting bearings 20 of the sealed ball bearing type are pressed and located at opposite ends thereof. A bearing spacer sleeve 21 is also provided which encloses the shaft 11 and which extends between said bearings and maintains them in spaced apart relationship.

Additional sealing means are provided for the sealing the outside of the collar 15, which means in the illustrated embodiment include a sealing element engageable with the collar and means for mounting the sealing element on the tub back. In the illustrated embodiment a double lipped resilient annular sealing member or ring 22 made of rubber or the like is provided for enclosing and sealingly engaging the collar 15. The ring 22 is U-shaped in diametrical cross-section and includes two axially spaced sealing lips 22a and 22b separated by a central annular groove or chamber. The ring 22 has a circular bore, the diameter of which substantially corresponds to that of the outer diameter of the main body portion of the collar 15, whereby the lips 22a and 22b sealingly engage the collar 15 about the entire periphery thereof. When the sealing ring 22 is mounted on the collar 15 as illustrated, the inner lip 22a preferably abuts with and sealingly engages the outer face 15f of the collar flange to provide additional sealing protection.

The central annular groove of the sealing ring 22 may be filled with a suitable sealing and/or lubricating substance 23 such as silicone or water grease which is not affected by water or other liquids which might be normally used in these machines and which serves as a lubricant and which provides additional sealing against water or other liquids or other foreign matter to prevent penetration thereof into the interior of the tub back assembly and the bearings.

An annular seal retaining plate 24 is provided for mounting the sealing ring 22 on the tub back and holding it in sealed engagement with the collar 15. The retaining plate 24 is preferably of generally conical design when viewed in cross-section and presents a convex surface to the liquid in the tub. That portion of the retaining plate exposed to the liquid is preferably of non-corrosive material such as plastic and is preferably provided with a hard smooth surface to which non-liquid substance or foreign matter such as lint will not cling or adhere, so that the retaining plate will be self-cleaning and minimize or eliminate the collection and build-up of lint and the like thereon. The central bore of the retaining plate is provided with an annular groove for receiving and seating a correspondingly shaped annular tapered mounting flange 22c on the sealing ring whereby the sealing ring 22 can be securely mounted in the bore of the retaining plate and held thereby, the ring 22 and plate 24 being in sealed engagement with each other to prevent the escape of liquid therebetween.

A plurality of openings 25 are provided about the circumference of the retaining plate adjacent the outer marginal edge thereof for receiving suitable screw fasteners 26 for securing the retaining plate 24 to the inner wall 17 of the tub back radially outwardly of the hub 19 whereby the hub 19 and the interior thereof are completely surrounded, enclosed and sealed by said retaining plate. An annular O-type gasket or sealing ring 27 having fastener receiving openings corresponding to openings 25 in the retaining plate is provided between the retaining plate and the inner wall of the tub back to provide a fluid-tight seal therebetween, the ring 27 being held in place by the fasteners 26. A slinger member or washer 28 having a raised cup section 28a opposed to the inner bearing is interposed between the bearing on the one side and the hub and collar on the other side.

Prior to mounting the tub back on the cylinder shaft 11, the bearings 20 and spacer sleeve 21 are mounted in the hub 19, the sealing ring 22 and retaining plate 24 are mounted on the inner wall 17, and the washer 28 is installed between the retaining plate and the inner bearing. The entire tub back assembly including the aforementioned components can then be mounted on and removed from the shaft 11 as a unit. The entire tub back assembly is mounted as a unit by inserting the shaft 11 in the central opening thereof and sliding the assembly over the cylinder shaft so that the cylinder shaft is supported by the bearings and so that the sealing ring 22 becomes mounted on the collar 15 in sealing engagement therewith in the manner hereinbefore described and illustrated so that the machine assumes the appearance of FIG. 2. After the tub back assembly has been mounted on the cylinder shaft, the aforementioned pulley P is mounted on the outer reduced threaded end 11b of the cylinder shaft and secured thereto by means of a Woodruff key 29, a washer 30 being interposed between the pulley and the outer bearing.

A nut 31 is then mounted on the threaded end portion 11b to hold the pulley P in place and hold the clothes basket and tub back assembly together in assembled relationship. The assembled cylinder and tub back are then mounted on the tub, the cylinder extending into the tub and enclosed thereby for rotation therewithin, the tub back enclosing the back of the tub and being secured thereto by the clamp ring R. When the machine is so assembled, the tub back assembly, and more particularly the bearings 20 constitute the sole support for the cylinder and cylinder shaft.

The machine is also provided with means for washing the exposed exterior surfaces of the sealing means to positively remove lint or the like which may have a tendency to collect thereon. The washing is accomplished by diverting a portion of the incoming liquid on its way to the tub and spraying the diverted portion on the retaining plate and other sealing elements to wash the surfaces thereof exposed to the lint from the tub. The spraying is preferably accomplished by directing a stream of liquid under pressure such as by a jet stream against the surfaces to be cleaned so that the force of the liquid will accomplish the desired removal of foreign matter. Any suitable means may be used to accomplish this washing, one means being schematically shown in the drawings. In FIG. 1, a liquid inlet hose 32 is provided for admitting the cleaning liquid or solvent to the machine. A branch hose 33 having a spray nozzle 34 is connected to hose 33 to divert a portion of the incoming liquid to nozzle 34, which nozzle is so positioned and mounted as to spray the liquid issuing therefrom on the exposed surfaces of the rings 14 and 22, the collar 15, and the retaining plate 24. The main portion of the incoming liquid continues on to the tub interior through the hose 35 which is also connected to the hose 32. The aforedescribed washing means may be utilized on machines having conventional sealing means as well as those embodying the sealing means of the present invention.

From the foregoing, it can be seen and appreciated that this invention provides a simpler and more effective bearing seal and less susceptible to mal-functioning due to collection of lint and the like thereon than has heretofore been available. The spongy resilient gasket 14 provides a fluid tight seal with the shoulders formed on the cylinder shaft hub and with the shouldered portions of the collar 15 whereby no liquid can pass from the interior of the machine along the outer surfaces of the cylinder shaft hub into the interior of the tub back assembly. The sealing ring 22 provides a fluid tight seal with the exterior surface of the collar 15 so that no fluid can leak from the interior of the machine along the outer surfaces thereof into the interior of the tub back assembly. This sealing action of the ring 22 is further enhanced by the sealing and lubricating compound housed therewithin. The hard smooth conically shaped outer face of the retaining plate enables the plate to be self-cleaning so as to readily shed lint and the like therefrom. The retaining plate and ring 22 combine to completely enclose and seal the hub 19 and the bearings 20 enclosed therewithin. It will be further appreciated that the novel sealing means of this invention are so designed as to minimize the effect of any lint or the like which might collect thereon despite the efforts made to prevent same.

It will, of course, be understood that various changes may be made in the form, details, arrangement and proportions of the various parts without departing from the scope of our invention.

What is claimed is:

1. In apparatus which includes a first member having an opening therein and a second member seated in said opening and having a pair of different diametered annular shoulders disposed outwardly of and facing said first member, the smaller of said shoulders being disposed between the larger of said shoulders and said first member, annular first sealing means mountable on said second member and capable of sealingly engaging the larger of said shoulders, an annular collar mountable on said second member adapted to abut with said smaller shoulder and engage said first sealing means and hold same against said larger shoulder, and annular second sealing means adapted to sealingly engage said collar and said first member whereby said opening is completely enclosed by said second sealing means and sealed from fluid disposed outwardly thereof.

2. The apparatus of claim 1, wherein said second sealing means includes a pair of annular laterally spaced apart portions in sealing engagement with said collar.

3. The apparatus of claim 1, wherein said first sealing means is compressible and is of larger diameter than that portion of the collar engaging same whereby said first sealing means when so compressed by said collar overlaps the marginal edge portion of the collar engaging and compressing same and overlies a portion of the outer peripheral wall thereof adjacent said marginal edge.

4. In apparatus which includes a first member having an opening therein and a second member seated in said opening and having three juxtaposed annular shoulders of successively larger diameter disposed outwardly of and facing said first member, the smallest of said shoulders being disposed closest to said first member, first annular sealing means mountable on the smallest of said shoulders and capable of sealingly engaging same about the entire periphery thereof, an annular collar mountable on said second member, said collar having an annular shoulder portion adapted to abut with said smallest shoulder of said second member and an annular flange adapted to engage said first sealing means and press and hold said first sealing means against the other two shoulders in sealing engagement therewith, and annular second sealing means adapted to sealingly engage said collar and said first member about the entire circumference of said opening whereby said opening is completely enclosed by said second sealing means and sealed from fluid disposed outwardly thereof.

5. The apparatus of claim 4, wherein said second sealing means includes a pair of annular laterally spaced apart portions whose inner walls sealingly engage the outer periphery of said collar about the entire periphery thereof.

6. The apparatus of claim 4, wherein the flanged portion of said collar opposing and engaging said first sealing means is provided with an annular beveled portion disposed generally opposite the intermediate sized shoulder of said series.

7. In apparatus which includes a first member having an opening therein and a second member seated in said opening and having an annular shoulder disposed outwardly of and facing said first member, annular first sealing means mountable on said second member for sealingly engaging said shoulder, an annular collar mountable on said second member having a radially outwardly extending annular flange portion adapted to engage said first sealing means and hold same against said shoulder, and annular second sealing means adapted to enclose and sealingly engage the outer wall of said collar about the entire periphery thereof and to sealingly engage said flange about the entire circumference thereof and further adapted to sealingly engage said first member about the entire circumference of said opening whereby said opening is completely covered and enclosed by said second sealing means and sealed from fluid disposed outwardly of said second sealing means.

8. In apparatus which includes a first member having an opening therein and a second member seated in said opening having an annular shoulder disposed outwardly of and facing said first member, annular first sealing means mountable on said second member and adapted to sealingly engage said shoulder, an annular collar mountable on said second member and adapted to engage said first sealing means and hold same against said shoulder in sealing engagement therewith, and annular second sealing means adapted to enclose said collar and sealingly engage said first member about the entire circumference of said opening, said second sealing means including a pair of annular laterally spaced apart resilient portions, the inner walls of which sealingly engage the outer periphery of said collar about the entire circumference thereof.

9. In apparatus which includes a first member having an opening therein and a second member seated in said opening, said second member having disposed outwardly of said first member a cylindrical portion which terminates outwardly in a series of three juxtaposed cylindrical shoulders of successively increasing diameter, all of said series of shoulders facing said first member, an annular deformable sealing element having a cylindrical inner bore capable of enclosing and sealingly engaging the smallest of said shoulders about the entire periphery thereof, a collar having a cylindrical wall portion capable of telescopically receiving said cylindrical portion of said second member, said collar having a countersunk portion providing an annular shoulder adapted to abut with the smallest of said series of shoulders and having a radially outwardly extending annular flange portion adapted to engage said sealing element and press and hold same against and in sealing engagement with the second and third shoulders of said series, and also having an annular beveled portion disposed generally opposite the second shoulder of said series, the outer marginal edge portion of said flange engaged with said sealing element being overlapped thereby and embedded therein when holding same in sealing engagement with said second and third shoulders of said series, a second annular sealing element having a pair of annular axially spaced apart sealing portions which define an interior annular groove which communicates with the bore thereof, the inner walls of said sealing portions enclosing and sealingly engaging the outer wall of the cylindrical wall portion of said collar about the entire periphery thereof, and annular mounting means enclosing and sealingly engaged with said second sealing element and mounted on said first member in sealing engagement therewith about the entire circumference of said opening.

10. The apparatus of claim 9 wherein one of said annular portions of said second sealing element also sealingly engages the flange portion of said collar about the entire circumference thereof.

11. In a cleaning machine which includes a tub, a cylinder for receiving the articles to be cleaned mounted within said tub for rotation relative thereto about a horizonal axis, said cylinder having a hub, a horizontally disposed shaft mounted on said hub, a cylinder supporting tub back assembly having an opening in which bearing means are mounted for receiving and supporting said shaft for free rotation relative thereto, said hub including a leading cylindrical portion concentrically arranged with respect to said shaft, an annular wall disposed outwardly of said opening and facing said back assembly and lying in a plane substantially perpendicular to the longitudinal axis of said shaft, and a pair of annular shoulders of different diameters arranged in side-by-side relationship concentrically of said cylindrical portion, said shoulders being of larger diameter than said cylindrical portion and of smaller diameter than said annular wall, the larger of said shoulders being contiguous with said annular wall, bearing sealing means comprising an annular sealing member having a cylindrical bore, the wall of which is capable of sealing engagement with the outer periphery of the smaller of said annular shoulders, a collar capable of receiving and enclosing said cylindrical portion, said collar being capable of engaging said sealing member and holding same against the larger of said shoulders and said annular wall in sealing engagement therewith, an annular mounting member attachable to said back assembly in sealing engagement therewith about the entire circumference of said opening, and a second annular cylindrically bored sealing member sealingly engaged with and held by said mounting member, said second sealing member enclosing and sealingly engaging said collar.

12. In a cleaning machine which includes a tub, a cylinder for receiving the articles to be cleaned mounted within said tub for rotation relative thereto about a horizontal axis, said cylinder having a hub, a horizontally disposed shaft mounted on said hub, a cylinder supporting tub back assembly having an opening in which bearing means are mounted for receiving and supporting said shaft for free rotation relative thereto, said hub including a leading cylindrical portion concentrically arranged with respect to said shaft, an annular wall disposed outwardly of said opening and facing said back assembly and lying in a plane substantially perpendicular to the longitudinal axis of said shaft, and a pair of annular shoulders of different diameters arranged in side-by-side relationship concentrically of said cylindrical portion, said shoulders being of larger diameter than said cylindrical portion and of smaller diameter than said annular wall, the larger of said shoulders being contiguous with said annular wall, bearing sealing means comprising an annular cylindrically bored sealing member capable of enclosing and sealingly engaging the peripheral wall of the smaller of said shoulders about the entire circumference thereof and further capable of sealingly engaging the larger of said shoulders and said annular wall about the entire circumference thereof, a cylindrical collar for enclosing said cylindrical portion, said collar having an annular radially outwardly extending flange capable of holding said sealing member in sealing engagement with the larger of said shoulders and said annular wall, an annular mounting member attachable to said back assembly in sealed engagement therewith about the entire circumference of said opening, and a second annular cylindrically bored sealing member mounted in the bore of said mounting member in sealed relationship therewith, said second member having a pair of axially spaced apart annular portions capable of enclosing and sealingly engaging said collar about the entire circumference thereof, one of said portions being in sealing engagement with said flange about the entire circumference thereof.

13. In a cleaning machine which includes a tub, a cylinder for receiving the articles to be cleaned mounted within said tub for rotation relative thereto about a horizontal axis, siad cylinder having a back wall and a hub secured to said back wall axially of said cylinder, a horzontal axis, said cylinder having a back wall and a hub extending outwardly of said back wall, a cylinder supporting tub back assembly including a wall opposed to and spaced from said cylinder back wall and having a horizontally oriented bore extending therethrough in which bearing means are mounted for receiving and supporting said shaft for free rotation relative thereto, said hub including a cylindrical portion concentrically arranged with respect to said shaft and disposed between the cylinder back wall and the said wall of said tub back assembly, said hub also having an annular shoulder extending radially of said cylindrical portion and facing said bore comprising annular first sealing means adapted to sealingly engage said shoulder about the entire circumference thereof, a collar telescopically mountable on said cylindrical portion and adapted to engage said first sealing means and hold same against said shoulder in sealing engagement therewith, and liquid impervious annular second sealing means extending between said collar and said wall of said tub back assembly, said second sealing means being adapted to sealingly engage said collar about the entire circumference thereof and to sealingly engage said wall of said tub back assembly about the entire circumference of said bore whereby said bore is sealed about the entire periphery thereof from liquid disposed between the cylinder back wall and said wall of said tub back assembly.

14. In apparatus which includes a first member having an opening therein and a second member seated in said opening having an annular shoulder disposed outwardly of and facing said first member, means for sealing said opening comprising annular first sealing means mountable on said second member for sealingly engaging said shoulder, an annular collar mountable on said second member and adapted to engage said first sealing means and hold same against said shoulder in sealing engagement therewith and annular second sealing means adapted to sealingly engage said collar and said first member whereby said opening is sealed about the entire periphery thereof from fluid disposed outwardly of said second sealing means, and wherein said first sealing means is compressible and is compressed by said collar and when so compressed overlaps the outer edges of that portion of the collar engaging and compressing same.

15. In apparatus which includes a first member having an opening therein and a second member seated in said opening having an annular shoulder disposed outwardly of and facing said first member, means for sealing said opening comprising annular first sealing means mountable on said second member for sealingly engaging said shoulder, an annular collar mountable on said second member and adapted to engage said first sealing means and hold same against said shoulder in sealing engagement therewith, and annular sealing means adapted to sealingly engage said collar and said first member whereby said opening is sealed about the entire periphery thereof from fluid disposed outwardly of said second sealing means, said second sealing means including two annular laterally spaced apart portions both of which are adapted to sealingly engage said collar.

16. The apparatus of claim 15, wherein the space between said annular portions is provided with lubricating and sealing substance.

References Cited by the Examiner
UNITED STATES PATENTS

| | | | |
|---|---|---|---|
| 1,807,214 | 5/31 | Jaxheimer | 68—140 |
| 2,349,901 | 5/44 | Breckenridge | 68—140 |
| 2,625,446 | 1/53 | Bjornstad | 308—36.1 |
| 2,649,765 | 4/53 | Anderson | 134—104 |
| 2,788,010 | 4/57 | Glassey et al. | 134—104 |
| 2,971,800 | 2/61 | Ruthner | 308—36.1 |

WALTER A. SCHEEL, *Primary Examiner.*

UNITED STATES PATENT OFFICE
CERTIFICATE OF CORRECTION

Patent No. 3,199,318

August 10, 1965

Eugene B. Sullivan et al.

It is hereby certified that error appears in the above numbered patent requiring correction and that the said Letters Patent should read as corrected below.

Column 8, lines 28 and 29, for "a horzontal axis, said cylinder having a back wall and a hub" read -- a horizontally disposed drive shaft mounted on said hub and --; line 41, before "bore" insert -- wall of said tub back assembly, and means for sealing said --; same column 8, line 51, strike out "assembly".

Signed and sealed this 15th day of March 1966.

(SEAL)
Attest:

ERNEST W. SWIDER
Attesting Officer

EDWARD J. BRENNER
Commissioner of Patents